Aug. 20, 1929. A. S. CUBITT ET AL 1,724,912
SEATING INDICATOR FOR CINEMATOGRAPH THEATERS AND THE LIKE
Filed Nov. 17, 1927
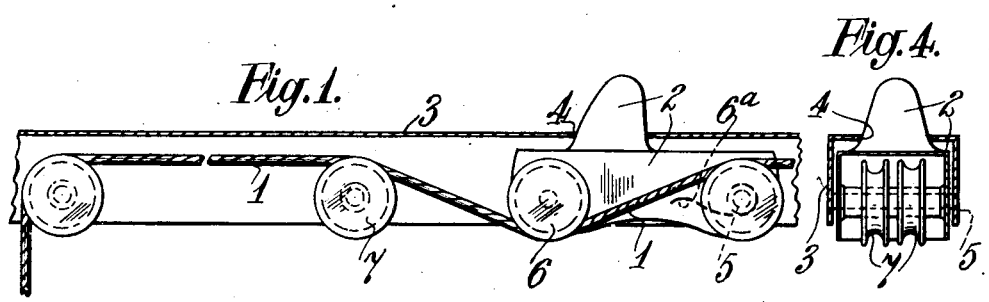
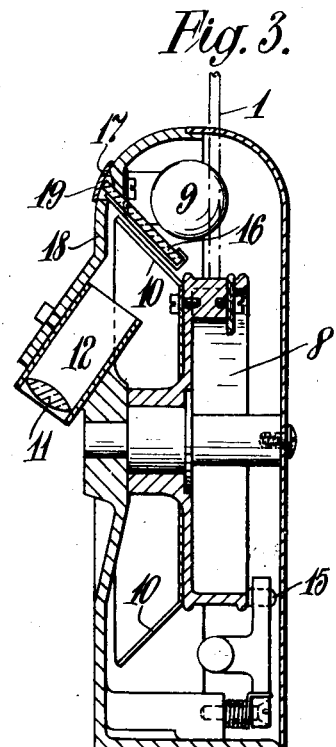
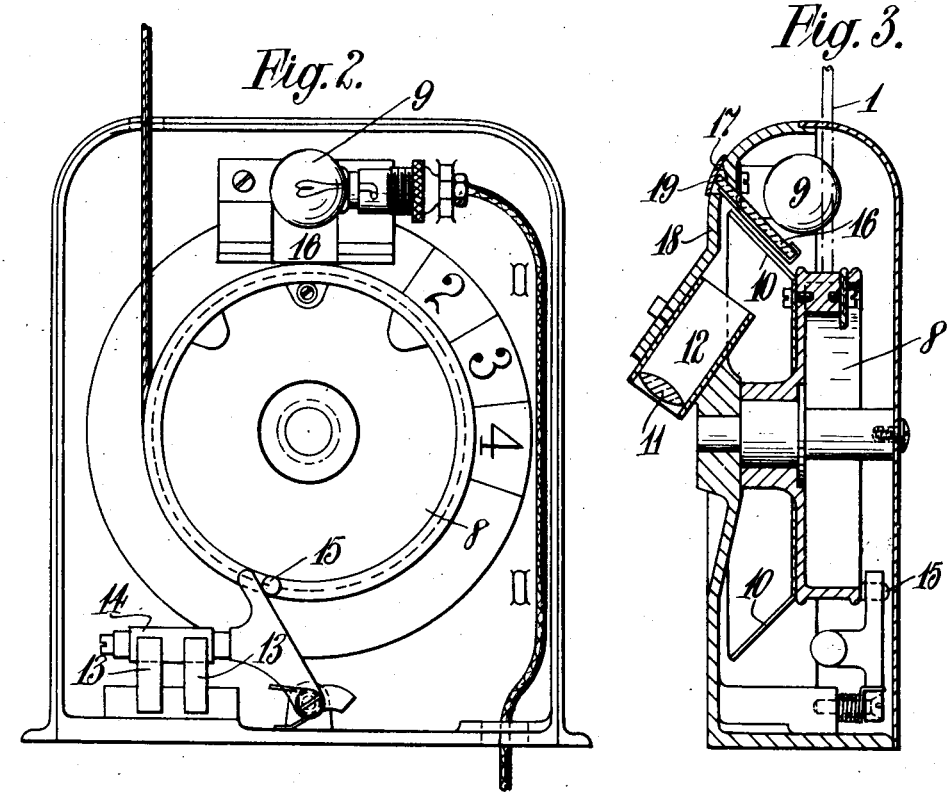

Patented Aug. 20, 1929.

1,724,912

UNITED STATES PATENT OFFICE.

ARCHIBALD STANNARD CUBITT AND GEORGE KRISTIAN JENSEN, OF LONDON, ENGLAND.

SEATING INDICATOR FOR CINEMATOGRAPH THEATERS AND THE LIKE.

Application filed November 17, 1927, Serial No. 234,013, and in Great Britain November 22, 1926.

This invention relates to apparatus for indicating vacant or engaged seats, and is well suited for use in cinematograph theaters, auditoriums and seating stands in general.

An object of the present invention is to provide improved apparatus of this kind in which on the depression or raising of a seat an indication is given at the end of a row or a batch of seats that the seat is occupied or vacant.

With this local indication there may be combined apparatus by which a general or repeat indication is given at a distance as to the seating accommodation in general or some local part of the general seating accommodation.

Under the present invention there is provided indicating apparatus which is noted for simplicity of parts, and is comparatively inexpensive to construct and fit up, and the component parts being easy of replacement.

A feature of the present invention is the provision of apparatus for indicating vacant or engaged seats, in which a device comprising a flexible or flexion component is moved by the depression or raising of a seat to actuate a visual indicating apparatus.

In an exemplary form of the invention the component is foreshortened on the depression or raising of a seat.

A further feature of the present invention is to provide a visual seat indicating apparatus of the kind referred to, so formed and operating as to vary the image cast by a light beam when the said apparatus is actuated by means moved on the depression or raising of a seat.

In the preferred form of apparatus according to the present invention the apparatus is arranged common to a number or row of seats, and the light source throws a spot light on to the floor to show a sign thereon.

The accompanying drawings illustrate by way of example one way of carrying the present invention into practice.

In the drawings:—

Fig. 1 is an elevation of that part of the apparatus under the seats, Fig. 2 a side view of the indicator itself, Fig. 3 an end view thereof, while Fig. 4 shows a detail view hereinafter referred to.

Referring to Figs. 1 to 3 inclusive there is provided a flexible cord, wire, chain or tape 1, which extends along each row of seats, this cord 1 or the like being so situated with regard to the seat, that when the seat is tipped town the weight of the occupier causes a movable member or projection 2 to depress a portion of the cord or the like, with the result that it is in effect shortened by a definite amount: This amount being regulated by the adjustment of the movement of the projection 2 and its relative position with regard to other fixed projections each side and below the cord or the like as hereinafter referred to.

One end of this cord or the like is fixed to the far end of the last seat with the result that the other end will be shortened by a definite amount for each seat depressed.

An indicator or counter is attached to this free end, which serves to indicate at or near the first seat of the row the number of seats occupied or depressed or alternatively and preferably the number of seats raised, i. e. vacant.

There is provided a channel shaped horizontally placed member 3 running from end to end of the row of seats and so arranged that the under side of the seat proper will rest upon the channel member when the seat is depressed.

In this member 3 are openings 4 through which project the aforesaid moving members 2 each arranged to be depressed by its corresponding seat. Each member 2 is pivoted at 5 to the channel member 3. Each of these moving members 2 carries a roller or pulley 6 on its under side to minimize friction of the cord or the like, this roller or pulley being just above the cord or the like. At each side of this roller or pulley 6 are fixed rollers or pulleys 7 but under the cord or the like and the relative positions of such rollers or pulleys are such that when the upper one is depressed the cord or the like is shortened a definite amount. The upper movable member 2 may be held in its normal position by a spring or springs 6ª so proportioned as to render it inoperative if a weight of less than that predetermined is placed upon the seat so as to prevent any wrong indication being caused by a coat or the like being placed upon the seat.

In the example shown the indicator proper comprises a drum or pulley 8 round which the cord 1 or the like is passed causing it to move through a definite angle for each seat depressed or occupied, this movement being indicated externally by means of a light 9 shining through suitably shaped perforations or figures 10 in or attached to the drum 8. This light projects through a lens 11 and an aperture or tube 12 so as to illuminate the floor of the aisle opposite each row of seats in addition to projecting the number or sign. Arrangements also may be made to cause an electrical contact 13, 14 to be made in the full or zero position of the indicator, and these contacts may be connected so as to indicate at a distance in a known manner when a row or group of seats is fully occupied. For example a stop 15 on the drum 8 may actuate the contacts 13 and 14.

Fig. 4 shows an arrangement of duplicate pulleys so that an indicator at each end of a row of seats will be actuated.

The signs 10 may be in the form of removable stencil plates, or transparent plates, or the equivalent.

The light beam may be conveniently coloured by the interposition of a medium 16 which may correspond in colour with the admission tickets for a particular batch of seats. The medium may be interchangeable. So the sign itself may bear in addition to the seating accommodation the seat value. Or a separate light spot may be thrown on the floor to indicate the seat value. An opening 17 in the indicator box 18 may be provided for easy exchange of the medium. This opening 17 may be covered by a flap 19.

By any suitable means a general or repeat indication may be given at a distance, say, in the box office or theater lobby, of the local indication given at or adjacent the seats. One way of doing this is to provide a commutator device under the control of the drum.

An indicator made according to the present invention is eminently suited for use in cinematograph theaters, as a visual indication is given on the aisle or gangway in a most convenient position or positions, without the apparatus encroaching on the walking or clearance room of the aisle or gangway, and at the same time there is provided a certain amount of illumination on the floor to give a guidance to the prospective occupiers and attendants, and this without affecting the projected pictures.

It is to be understood that variations may be made in the construction of the apparatus according to the present invention and that the construction illustrated is merely by way of example.

We are aware that it has been proposed to use a flexible cord and spring depressed plungers so that on movement of a seat a plunger draws on said cord to actuate a visual indicator whereby the number of seats vacant or occupied is indicated at the end of a row of seats.

What we claim is:—

1. Apparatus for indicating vacant or engaged seats in a row of seats, comprising in combination, a pivoted member for each seat, a cable supporting the members, a sign bearing member to which the cable is attached, and a light source for throwing an image of the sign in the beam of said light source, said sign bearing member being rotated in one direction by the depression of the seats pressing the pivoted members to shorten said cable.

2. Apparatus for indicating vacant or engaged seats in a row of seats, comprising in combination, a pivoted member for each seat, a cable supporting the members, a drum to which the cable is attached, a sign bearing member carried by said drum, a lens, and a light source, said light source projecting an image of the sign in the beam of said light source through said lens on to the floor, said drum being rotated in one direction by the depression of the seats pressing the pivoted members to shorten said cable.

3. Apparatus according to claim 1, having a spring for returning the pivoted member to normal position when the seat is raised.

In testimony whereof, we affix our signatures.

ARCHIBALD STANNARD CUBITT.
GEORGE KRISTIAN JENSEN.